(12) United States Patent
Tabanou et al.

(10) Patent No.: US 8,756,016 B2
(45) Date of Patent: Jun. 17, 2014

(54) METHOD AND SYSTEM TO ESTIMATE FRACTURE APERTURE IN HORIZONTAL WELLS

(75) Inventors: Jacques R. Tabanou, Houston, TX (US); Denis Heilot, Sugar Land, TX (US); Bernadette Tabanou, legal representative, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 561 days.

(21) Appl. No.: 12/396,746

(22) Filed: Mar. 3, 2009

(65) Prior Publication Data

US 2010/0191470 A1    Jul. 29, 2010

Related U.S. Application Data

(60) Provisional application No. 61/148,315, filed on Jan. 29, 2009.

(51) Int. Cl.
  *G01V 1/40* (2006.01)
  *G01V 3/00* (2006.01)
  *E21B 49/00* (2006.01)
(52) U.S. Cl.
  USPC .............................. 702/7; 324/346; 166/250.1
(58) Field of Classification Search
  USPC ............... 702/7, 1–2, 6, 9–14, 127, 138, 189, 702/196; 324/323–324, 345–346, 366; 166/244.1, 250.01, 250.02, 250.1, 166/254.2, 259, 271, 307, 308.1; 367/25, 367/35; 703/2, 5, 10
  See application file for complete search history.

(56) References Cited

U.S. PATENT DOCUMENTS

| | | | |
|---|---|---|---|
| 2,244,484 A | 6/1941 | Beers | |
| 3,668,619 A | 6/1972 | Dennis | |
| 4,802,144 A | 1/1989 | Holzhausen et al. | |
| 5,121,363 A | 6/1992 | Benzing | |
| 5,243,521 A | 9/1993 | Luthi | |
| 5,656,930 A * | 8/1997 | Hagiwara | 324/339 |
| 6,798,208 B2 | 9/2004 | Omeragic | |
| 6,904,365 B2 * | 6/2005 | Bratton et al. | 702/9 |
| 7,089,167 B2 * | 8/2006 | Poe | 703/10 |
| 7,359,800 B2 * | 4/2008 | Rabinovich et al. | 702/7 |
| 2004/0001388 A1 * | 1/2004 | Kriegshauser et al. | 367/21 |
| 2005/0256645 A1 | 11/2005 | Rabinovich et al. | |
| 2009/0192714 A1 * | 7/2009 | Xue et al. | 702/7 |
| 2010/0019771 A1 * | 1/2010 | Gold et al. | 324/355 |
| 2010/0039115 A1 * | 2/2010 | Bespalov et al. | 324/355 |
| 2010/0082255 A1 * | 4/2010 | Davydycheva et al. | 702/7 |

OTHER PUBLICATIONS

Jahn, Frank; Cook, Mark; Graham, Mark; Hydrocarbon Exploration and Production; 1998; Elsevier Science B.V.; pp. 143-145.*
Barbara Ina Anderson, Modeling and Inversion Methods for the Interpretation of Resistivity Logging Tool Response, 2001, B.Sc. Thesis, Western Connecticut State University, 386 pp.*

(Continued)

*Primary Examiner* — Toan Le
(74) *Attorney, Agent, or Firm* — Kenneth Liu

(57) ABSTRACT

A method for estimating a fracture aperture in a formation penetrated by a well includes obtaining at least one of a vertical resistivity (Rv) and a horizontal resistivity (Rh) of the formation; obtaining a mud resistivity ($R_{mud}$) or a matrix resistivity ($R_{matrix}$); and estimating the fracture aperture. The estimating of the fracture aperture may be performed by solving the following two equations:

$R_v = V_{hf} R_m + (1 - V_{hf}) \cdot R_{matrix}$ and $1/R_h = V_{hf} 1/R_{mud} + (1 - V_{hf}) \cdot 1/R_{matrix}$, wherein $V_{hf}$ is the fracture aperture.

12 Claims, 5 Drawing Sheets

(56) References Cited

OTHER PUBLICATIONS

Wang et al., "Characterizing Fractures with Multicomponent Induction Measurements," Petrophysics, v. 46, No. 1, pp. 42-51 (Feb. 2005).

Hornby et al., "Fracture Evaluation using reflected Stoneley-wave Arrivals," Geophysics, v. 54, No. 10 pp. 1274-1288 (Oct. 19898).

Luthi et al., "Fracture Apertures from Electrical Borehole Scans," Geophysics, v. 55, No. 7, pp. 821-833 (Jul. 1990).

Cheung et al., "Workstation-Based Fracture Evaluation using Borehole Images and Wireline Logs," SPE 20573, pp. 465-474 (1990).

D. Timko, "A Case against Oil Muds," Log Analyst, pp. 29-33 (Nov. 1966-Jan. 1967).

Sibbit et al., "The Dual Laterolog response in Fractured Rocks," SPWLA 26th Annual Logging Symposium (Jun. 17-20, 1985).

* cited by examiner

METHOD AND SYSTEM TO ESTIMATE FRACTURE APERTURE IN HORIZONTAL WELLS

RELATED APPLICATION DATA

The present application claims priority from U.S. Provisional Patent Application No. 61/148,315, filed Jan. 29, 2009.

BACKGROUND OF INVENTION

1. Field of the Invention

The invention relates generally to oil and gas exploration, particularly to methods and systems for estimating fracture apertures in the formations and for assessing fracture aperture changes in response to well stress.

2. Background Art

Fractures in the formation may be storage sites for hydrocarbons or they may enhance permeability of formations by connecting pores that might contain hydrocarbons. Therefore, identification and characterization of fractures is an important part of formation characterization. Fractures are cracks or surface breakages within rocks. When there is relative movement (displacement) of the rocks across the fracture face, the fracture may be referred to as a fault or joint, depending on the relative movement. For convenience, "fracture" will be used in a general sense in this description to include fractures, faults, joints, or other similar geological features.

Locating the intervals where the borehole intercepts large and/or numerous fractures (e.g., fracture swarms) is important to characterize the fractured reservoir and to optimize completion and production operations.

Determining natural fracture aperture is also essential to estimate permeability in Fractured Reservoir Formation. In the case where fracture is the primary, or an important contributor, to the reservoir storage, natural fracture aperture is also essential to determine the formation porosity.

Various methods have been proposed to detect fractures and estimate their aperture from resistivity log (Sibbit and Faivre, 1985, "The Dual Laterolog Response in Fractured Rock," Transaction of SPWLA 26-th Annual Logging Symposium, 1985, Dallas, paper T), borehole image (Luthi and Souhaite, 1990, "Fracture aperture from electrical borehole scans," *Geophysics,* 1990, vol 55; Cheung and Heliot, 1990 "Workstation-based Fracture Evaluation Using Borehole Images and Wireline Logs," SPE 20573), and sonic measurement (Hornby and Johnson, 1986, Winkler K, Plumb R., "Fracture Evaluation using reflected Stoneley Wave arrivals," *Geophysics,* 1986, vol 54.).

Seismic data is commonly used for acquiring information about subsurface structures. Changes in the elastic properties of subsurface rocks appear as seismic reflections. Such changes in the properties of the rocks typically occur at boundaries between geologic formations, at fractures and at faults. For example, U.S. Pat. No. 3,668,619 describes the rotation of a logging tool having a single acoustic transducer that senses the reflected acoustic energy to detect fractures. U.S. Pat. No. 5,121,363 describes a method for locating a subsurface fracture based on an orbital vibrator equipped with two orthogonal motion sensors and an orientation detector.

Sonic measurements are sensitive to natural fractures (Hornby B. et al, 1986), but also to stresses and local borehole damage, making it difficult to use them systematically to quantify fracture characteristics.

In addition to seismic or sonic measurements, other measurements have also been used to locate fractures. For example, U.S. Pat. No. 4,802,144 uses the measurement of hydraulic impedance to determine fractures. U.S. Pat. No. 2,244,484 measures downhole impedance to locate fractures by determining propagation velocity. Resistivity tools are particularly useful in this regard. Similarly, U.S. Pat. No. 6,798,208, issued to Omeragic, which discloses a method for detecting a fracture in an earth formation using a propagation tool. The method includes the steps of producing electromagnetic fields using a transverse magnetic dipole (TMD) transmitter in the tool; measuring corresponding voltage signals detected with one or more TMD receivers in the tool; determining harmonics from the measured signal responses by shifting the responses (e.g. by 90 degrees) and performing an addition or subtraction using the shifted response.

Separation between shallow and deep laterolog readings has also been used as an indicator of natural fractures (Sibbit and Faivre, 1985). It is often used to help distinguish natural and induced fractures after those fractures have been picked on borehole image (Cheung and Heliot, 1990). However, this type of measurement does not provide any quantitative assessment of the fracture extent and aperture.

Borehole images allow one to identify, pick and characterize individual fractures as seen on the borehole wall. Techniques exist to quantify the aperture of each fracture based on the images (Luthi and Souhaite, 1990; Cheung and Heliot, 1990). However, those measurements have a very shallow depth of investigation, making it difficult to differentiate the natural fracture characteristics from the borehole damages.

The sensitivity of multi-component induction measurement to a fracture has been demonstrated by numerical modeling and field examples. (Wang et al. 2005) Discussion centers on the sensitivity of coplanar-coil (XX and YY) and co-axial-coil (ZZ) measurement to fractures. The numerical modeling is for one individual fracture, with application primarily to hydraulic fracture.

Because fractures often contain hydrocarbons, identification and quantification of the fractures in formations penetrated by a well can provide valuable information for optimal production of the wells. Therefore, it is desirable to have methods that can detect and quantify the presence of fractures.

SUMMARY OF INVENTION

One aspect of the invention relates to methods for estimating a fracture aperture in a formation penetrated by a well. A method in accordance with one embodiment of the invention includes obtaining at least one of a vertical resistivity (Rv) and a horizontal resistivity (Rh) of the formation; obtaining a mud resistivity ($R_{mud}$) or a matrix resistivity ($R_{matrix}$); and estimating the fracture aperture. The estimating of the fracture aperture may be performed by solving the following two equations:

$$R_v = V_{hf} R_{mud} + (1-V_{hf}) \cdot R_{matrix} \text{ and } 1/R_h = V_{hf} 1/R_{mud} + (1-V_{hf}) \cdot 1/R_{matrix},$$

wherein $V_{hf}$ is the fracture aperture.

Another aspect of the invention relates to systems for estimating a fracture aperture in a formation penetrated by a well. A system in accordance with one embodiment of the invention includes a memory storing a program having instructions to cause a processor to perform: obtaining at least one of a vertical resistivity (Rv) and a horizontal resistivity (Rh) of the formation; obtaining a mud resistivity ($R_{mud}$) or a matrix resistivity ($R_{matrix}$); and estimating the fracture aperture.

Other aspects and advantages of the invention will be apparent from the following description and the appended claims.

DETAILED DESCRIPTION

Embodiments of the invention relate to methods and system for estimating fractures in formation penetrated by a well. Embodiments of the invention are particularly applicable to horizontal or highly deviated well drilled to cross fractures. Methods of the invention allow a user to identify fractured intervals and to quantify fracture apertures. Therefore, methods of the invention may help in the estimation of formation porosity and permeability.

Furthermore, when applied to logs acquired with varying pressures in the well, methods of the invention allow a user to characterize how fracture apertures change in response to pressure variations. This is useful in forecasting reservoir performance as the reservoir is being depleted and makes it possible for the operator to optimize completion and production accordingly to maximize total recovery.

Embodiments of the invention may use any tools that can measure the resistivity parallel (in general term) and perpendicular (in general term) to the borehole axis. For example, RtScanner™ (Wireline tool) and PeriScope 15™ (Logging While Drilling tool) are available from Schlumberger Technology Corp. (Houston, Tex.) for such measurements. Resistivity parallel to the borehole axis is commonly referred to as vertical resistivity (Rv), while resistivity perpendicular to the borehole axis is commonly referred to as horizontal resistivity (Rh).

Such tools may be electromagnetic (EM) logging tools that are equipped with antennas as EM sources (transmitter) and/or sensors (detectors). The antennas on these tools are generally formed as loops or coils of conductive wire. In operation, a transmitter antenna may be energized by an alternating current to emit EM energy (as electromagnetic fields) through the borehole fluid ("mud") into the surrounding formations. The EM fields interact with the borehole and formation to produce signals (e.g., induced eddy currents or secondary electromagnetic fields) that are then detected and measured by one or more receiver antennas. The detected signals reflect the interactions with the mud and the formation. By processing the detected signals, a log or profile of the formation and/or borehole properties may be determined.

Figure 1:
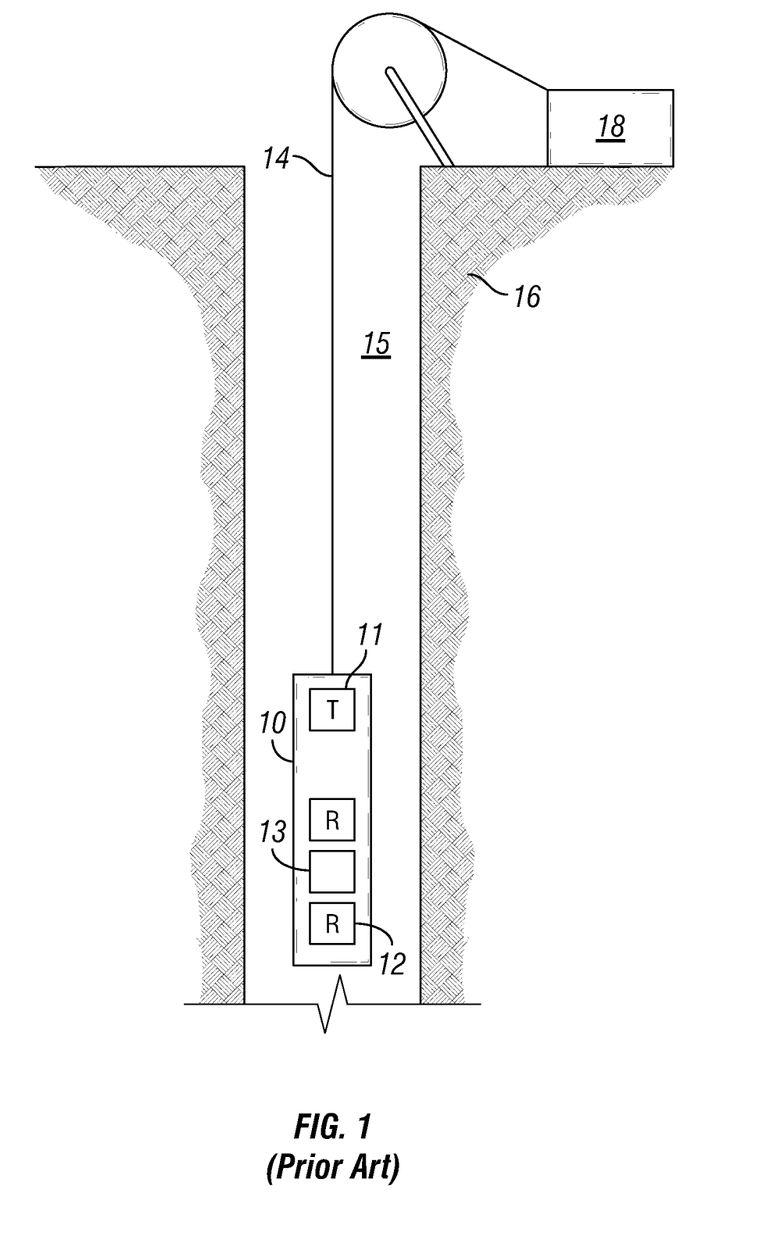
FIG. 1 shows a prior art wireline logging system disposed in a well penetrating a formation.

As shown in FIG. 1, a logging tool 10 may be lowered into a wellbore 15 that penetrates a formation 16. In this example, the tool 10 is a wireline tool that is lowered into the well via a cable (wireline) 14. However, embodiments of the invention may also be used with a logging-while-drilling (LWD) tool. The tool 10 may include one or more transmitters 11 and one or more receivers 12. In addition, the tool 10 may include a circuitry 13 that may comprise a processor and a memory for performing calculations and/or storage of the log data. Alternatively, the log data may be transmitted uphole to a surface computer 18 that typically includes a processor and a memory storing one or more programs for analyzing the log data.

Conventional EM tools may have the coils wound around the longitudinal axis of the tool. As a result, the magnetic dipoles of the transmitters and receivers of these tools are oriented along the longitudinal axis of the tool. Such coils are said to have longitudinal magnetic dipoles (LMD). The LMD tools will induce eddy currents circling around the borehole. Therefore, these tools are useful in the measurements of conductivity of the formation in the horizontal direction (i.e., in the plane perpendicular to the borehole)—Rh.

Newer EM tools may have transmitters and/or receivers designed to have magnetic dipoles that are not aligned with the longitudinal axis of the tool, i.e., such antennas (coils) may have their magnetic dipoles in a tilted or transverse direction with respect to the longitudinal axis of the tool. Tools having such antennas are generally referred to as transverse magnetic moment (TMD) tools. A TMD tool will be able to induce eddy currents to flow in a direction non-perpendicular to the borehole axis. That is, the eddy currents will have components that flow across sedimentation layers in a vertical well, for example. Thus, TMD tools are useful in obtaining resistivity data in the direction parallel with the borehole axis, i.e., Rv.

By judicial use of TMD and LMD tools, an operator may obtain measurements related to formation resistivity in the horizontal and vertical directions (i.e., Rh and Rv measurements). Once the Rh and Rv measurements are available, it becomes possible to locate and identify geophysical features (such as fractures and dipping planes) of a formation. For an example, see U.S. Pat. No. 6,798,208 issued to Omeragic, which discloses methods for identifying fractures and their orientations in the formations.

Figure 2:
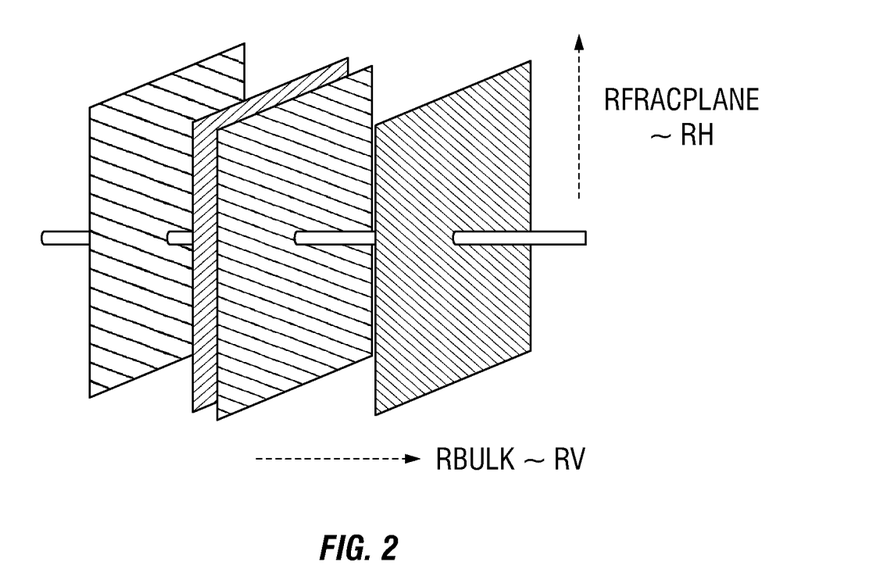
FIG. 2 shows a schematic illustrating a well penetrating several fractures in a formation. The schematic also illustrates the vertical resistivity (Rv) and horizontal resistivity (Rh) relative to the well axis.

As noted above, fractures may be storage sites for hydrocarbons. Furthermore, fractures may connect formations pores and provide flow paths for the hydrocarbons in the reservoir to flow to the well. Therefore, when drilling a well, it is desirable to drill across as many fractures as possible in order to maximize the production. Because natural fractures typically run in the same orientations, it would be desirable to drill a well in a direction perpendicular to the fracture faces. FIG. 2 illustrates an example wherein an horizontal well drilled perpendicularly to the planes of a set of natural fractures.

Before one can design an optimal way to produce the well, it is desirable to know the fracture density (the number of fractures) and the apertures of the fractures in a particular interval (zone) of the well. Embodiments of the invention provide methods that allow an operator to estimate the apertures of the fractures. In addition, some embodiments of the invention allow an operator to estimate the changes of the fracture apertures as a function of borehole pressures. This information will be useful for optimizing the production of a well.

Methods of the invention may use resistivity measurements obtained using any existing tools, such as the wireline tool illustrated in FIG. 1 or an LWD tool. The following illustrates how these resistivity measurements may be used to derive the fracture apertures in accordance with embodiments of the invention.

Figure 3:
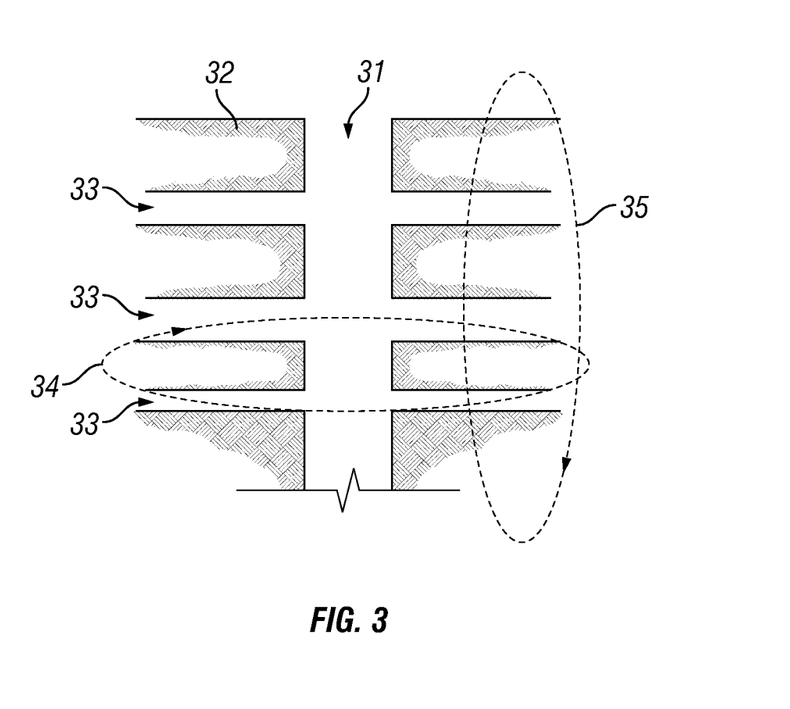
FIG. 3 shows a diagram illustrating a formation having several fractures and the eddy currents induced in the horizontal and vertical directions relative to the well axis.

FIG. 3 shows a schematic illustrating a well 31 penetrating a formation 32, which includes several fractures 33. The fractures may have different apertures. A formation may be characterized by its matrix resistivity $R_{matrix}$. Each Fracture i is characterized by its aperture $h_i$. A given interval of the borehole is characterized by the cumulative aperture of the fractures crossing the borehole per unit length of that borehole or $V_{hf}$. Note that the cumulative fracture aperture, $V_{hf}$, represents a fraction of the well interval and therefore is less than 1 (i.e., $V_{hf}<1.0$).

If an LMD tool is used to log this interval of the well, the eddy currents induced in the formation will be in planes perpendicular to the well axis, as illustrated in 34. Thus, the horizontal resistivity (Rh) measurements will reflect a summation of currents flowing in the formation layers and the fracture layers, as if these different layers form parallel circuits. On the other hand, if a TMD tool is used to log this interval, the eddy currents will flow in the formation in a direction parallel with the well axis, as illustrated in 35. Because the eddy currents flow through various layers, the resistivity measurements in the vertical direction (Rv) will reflect a summation of resistivities of the various layers in the path of the eddy currents.

Assuming that the open natural fracture is filled with mud of resistivity $R_{mud}$ at the time of the logging, and that the matrix is not invaded, one would have:

$$R_v = V_{hf} \cdot R_{mud} + (1-V_{hf}) \cdot R_{matrix} \quad (1)$$

and:

$$1/R_h = V_{hf} \cdot 1/R_{mud} + (1-V_{hf}) \cdot 1/R_{matrix} \quad (2)$$

wherein the $R_{matrix}$ is the resistivity of the virgin (not invaded) formation matrix. Because in water-based mud, the resistivity of the mud is much smaller than that of the formation, i.e., $R_{mud} \ll R_{matrix}$, and $V_{hf} \ll 1$ (in most situations), Equation (1) may be simplified as:

$$R_v \sim (1-V_{hf}) \cdot R_{matrix} \quad (1a)$$

and Equation (2) may be simplified as:

$$1/R_h \sim V_{hf}/R_{mud} \quad (2a)$$

Equations (1a) and (2a) show that the Rv and Rh measurements vary roughly with the cumulative fracture aperture $V_{hf}$ in the interval of the well. Thus, Rv and Rh measurements should provide sensitive indicators of $V_{hf}$. In accordance with some embodiments of the invention, the Rv and/or Rh measurements may be used to detect the presence ($V_{hf}>0$) or absence ($V_{hf}\sim 0$) of fractures in a well in the interval of interest.

In accordance with some embodiments of the invention, the presence or absence (i.e., qualitative determination) and the magnitude fracture aperture (i.e., quantitative determination) in a particular interval of a well may be determined using the above Equations and the Rv, Rh and $R_{mud}$ measurements.

For example, if one knows that the cumulative fracture aperture is significantly smaller than 1 (i.e., a small fraction of the interval is fractured), then one may simply use Equation 2(a) to quickly estimate the $V_{hf}$ based on Rh and the known $R_{mud}$, which is readily measured. Similarly, if $R_{matrix}$ is known, then one can use Equation 1(a) and Rv to estimate the $V_{hf}$.

Furthermore, other methods of the invention may use Rv, Rh, and $R_{mud}$, using Equations (1) and (2), to solve for $V_{hf}$. With this approach, one may solve for $V_{hf}$ and $R_{matrix}$ by solving Equations (1) and (2) simultaneously. The $R_{matrix}$ thus derived in the neighboring intervals (zones) may be compared and used as a quality check, assuming that the neighboring intervals have the same $R_{matrix}$. This approach does not assume that the cumulative fracture aperture is significantly smaller than 1. Therefore, this method is applicable in most situations. Similarly, if one of the Rv, Rh, and $R_{mud}$ measurements is not available, but $R_{matrix}$ is available, then one can use Equations (1) and (2) to solve for the missing measurement and $V_{hf}$.

Figure 4:
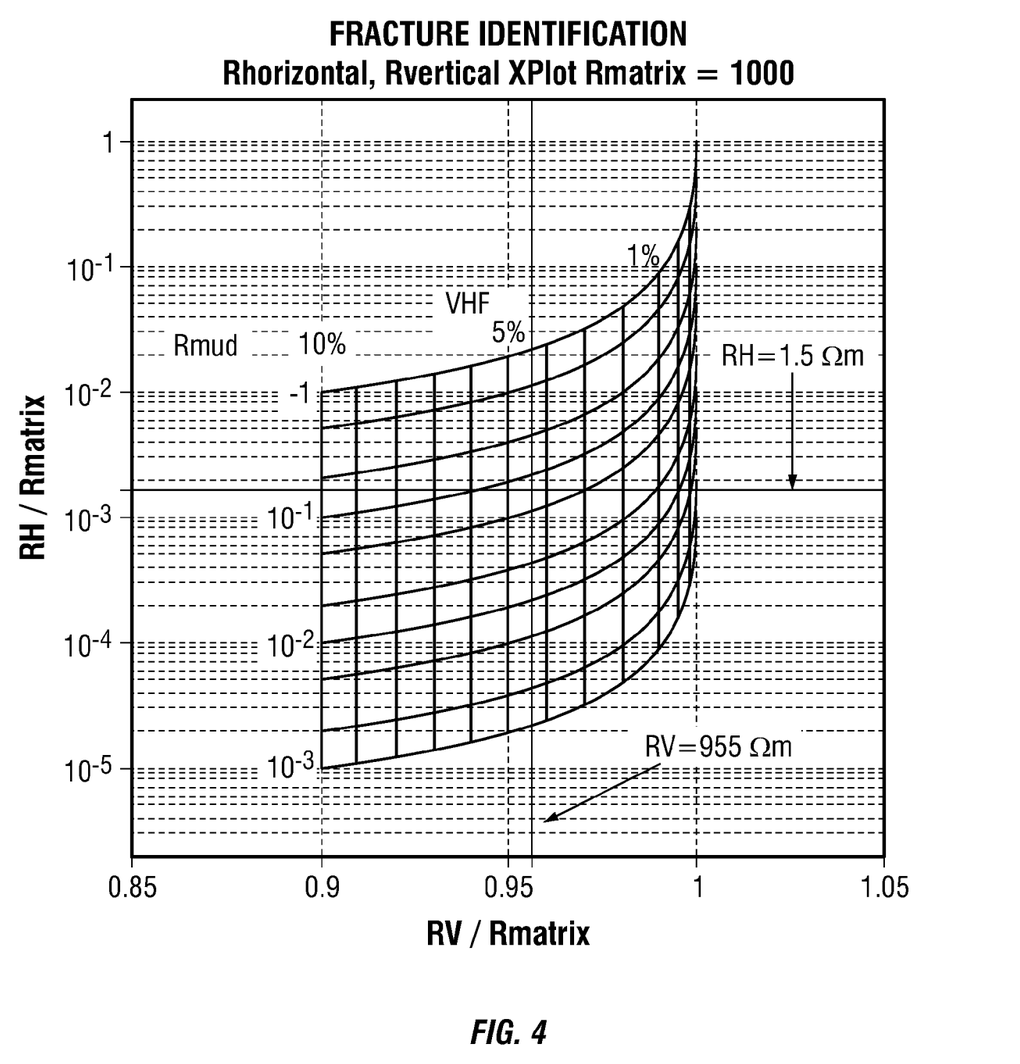
FIG. 4 shows a chart that can be pre-computed based on Rv, Rh, and $R_{mud}$ as a function of fracture apertures in accordance with one embodiment of the invention. Such a chart can be used to estimate fracture apertures based on Rv, Rh, and $R_{mud}$ measurements.
Figure 5:
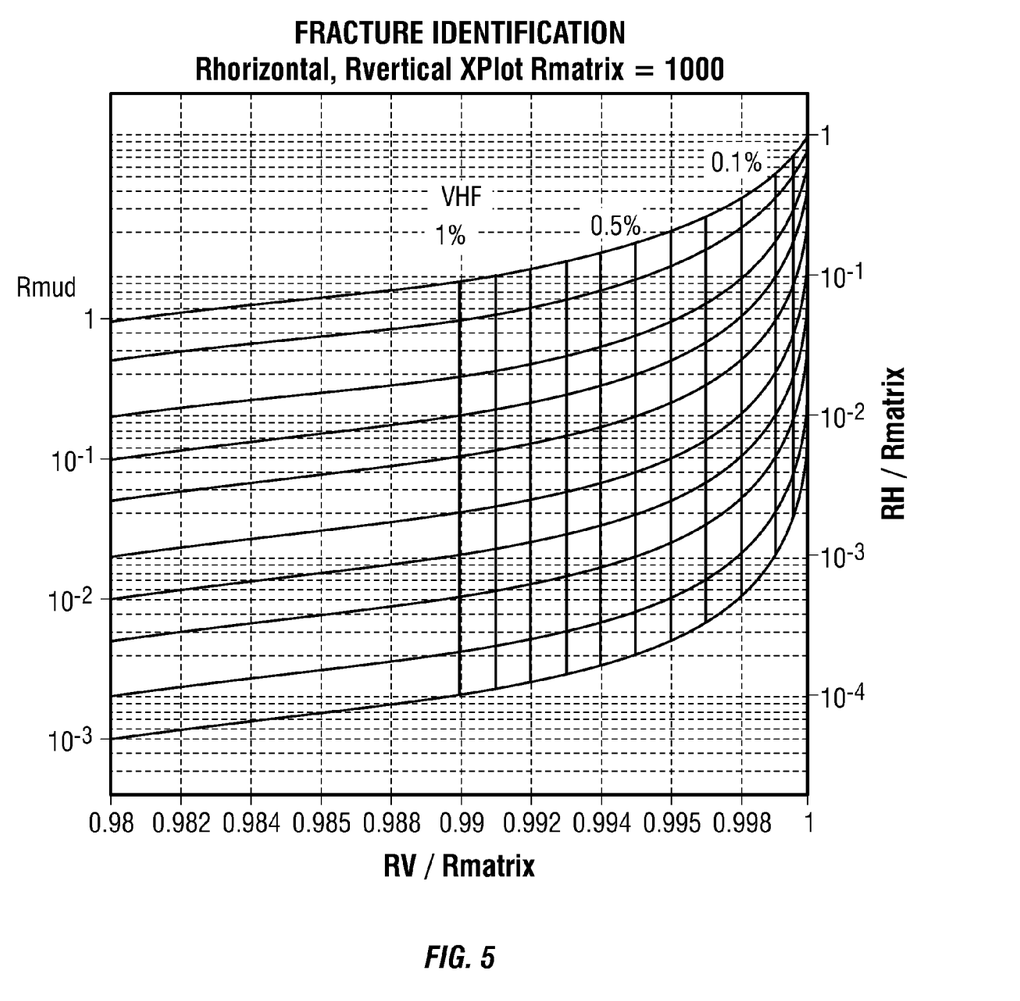
FIG. 5 shows an expanded region of the chart of FIG. 4.

In addition to solving a simultaneous equations as described above, some embodiments of the invention may use a pre-computed cross plot of Rv versus Rh, for example, to facilitate the estimation of the cumulative fracture apertures. FIG. 4 shows that the (Rv, Rh) measurements are indeed highly dependent on the cumulated fracture aperture $V_{hf}$. FIG. 5 shows an expanded region of the chart shown in FIG. 4. Therefore, one can get a robust estimate of $V_{hf}$ from a chart pre-computed with the measurements of $R_v$, $R_h$, and $R_{mud}$, as shown in FIG. 4 or FIG. 5.

Using methods of the invention, fractures apertures may be derived for a plurality of intervals within a zone or zones of interest to produce a log of fracture apertures. That is, a log of fracture aperture by unit length of borehole $V_{hf}$ can be computed from the (Rv, Rh) measurements. Such a log not only indicates the location of the open fractures, but also quantifies their contributions to the overall permeability of the fractured reservoir. This information is important for the characterization of fracture distributions (regular fracture spacing vs. fracture swarms) and for well completion.

Some embodiments of the invention provide methods for estimating fracture aperture changes as a function of the borehole stress. Borehole stress may be induced by varying the pressures in the borehole. Although it is known that natural fractures open and close as a function of the pressure in the well, and that this affects log measurements, (See e.g., Timko D. T., 1966, *"A Case Against Oil Muds,"* The log analyst, November 1966, 4.), no quantitative study was available.

Figure 6:
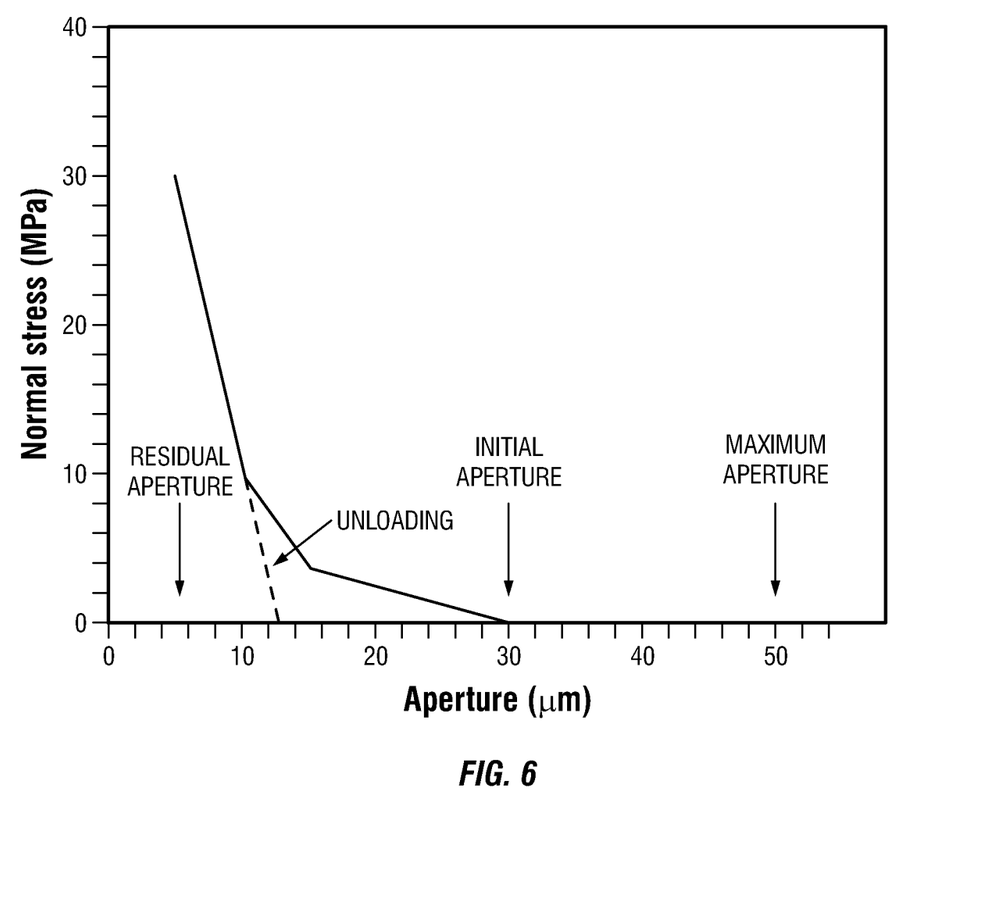
FIG. 6 shows a chart illustrating changing fracture apertures as a function of normal stresses to the fractures.

When several log passes are performed over the same zone at different well pressures, the matrix resistivity and the mud resistivity would not change appreciably, if at all. However, the fracture apertures would change in response to the stress normal to the fracture faces. Therefore, in accordance with embodiments of the invention, a quantitative relationship can be derived between fracture aperture changes and well pressure variations, based on Rv and Rh measurements. FIG. 6 shows a theoretical relationship between fracture aperture and stress normal to the fracture, which can be computed from well pressure and in situ stresses.

Some embodiments of the invention relate to systems for estimating fracture apertures in a well. A system in accordance with embodiments of the invention may include a processor and a memory, wherein the memory stores a program having instructions for performing the steps of a method of the invention. Such a system may include any processor, such as a personal computer or a processor on a tool (e.g., 13 in FIG. 1) or at a well site.

Some embodiments of the invention relate to computer readable media that may include a program having instructions to cause a processor to perform the steps of a method of the invention. Such computer medium may be any known in the art, such as hard drive, floppy disk, CD, DVD, magnetic tape, etc.

Advantages of embodiments of the invention may include one or more of the following. Embodiments of the invention provide convenient methods for estimating fracture apertures. Knowledge of fracture apertures is important in the optimization of the completion and production of a well. In addition, embodiments of the invention also provide methods for estimating the changes of fracture apertures as a function of well stress. This information is useful in designing the optimal way to obtain maximal production from a well, particularly when a well has been produced for some time.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating a cumulative fracture aperture in a microscopically anisotropic formation penetrated by a well, comprising:

measuring a vertical resistivity (Rv) of the microscopically anisotropic formation using a TMD (transverse magnetic dipole) logging tool and a horizontal resistivity (Rh) of the microscopically anisotropic formation using a LMD (longitudinal magnetic dipole) logging tool;

measuring with one of the logging tools at least one of a mud resistivity ($R_{mud}$) or a matrix resistivity ($R_{matrix}$); and estimating the cumulative fracture aperture using the resistivity measurements, wherein the estimating comprises simultaneously solving the following two equations:

$$R_v = V_{hf} \cdot R_{mud} + (1 - V_{hf}) \cdot R_{matrix}$$

and $$1/R_h = V_{hf} \cdot 1/R_{mud} + (1 - V_{hf}) \cdot 1/R_{matrix}$$

wherein $V_{hf}$ is the cumulative fracture aperture.

2. The method of claim 1, wherein the well is a horizontal well or a highly deviated well.

3. The method of claim 1, wherein the horizontal resistivity (Rh) and the mud resistivity ($R_{mud}$) are measured, and wherein the estimating is performed using the equation:

$$1/Rh = V_{hf}/R_{mud},$$

wherein $V_{hf}$ is the cumulative fracture aperture and $V_{hf}$ is much less than 1.

4. The method of claim 1, wherein the vertical resistivity (Rv) and the matrix resistivity ($R_{matrix}$) are measured, and wherein the estimating is performed using the equation:

$$Rv = (1 - V_{hf}) \cdot R_{matrix},$$

wherein $V_{hf}$ is the cumulative fracture aperture and $V_{hf}$ is much less than 1.

5. The method of claim 1, further comprising identifying fractured intervals using the estimated cumulative fracture aperture.

6. The method of claim 1, further comprising estimating formation porosity or formation permeability using the estimated cumulative fracture aperture.

7. A system for estimating a cumulative fracture aperture in a microscopically anisotropic formation penetrated by a well, comprising:

a TMD (transverse magnetic dipole) logging tool, a LMD (longitudinal magnetic dipole) logging tool, and a processor having a memory storing a program having instructions to cause the processor to perform:

measuring a vertical resistivity (Rv) of the microscopically anisotropic formation using the TMD logging tool and a horizontal resistivity (Rh) of the microscopically anisotropic formation using the LMD logging tool;

measuring a mud resistivity ($R_{mud}$) or a matrix resistivity ($R_{matrix}$); and estimating the cumulative fracture aperture using the resistivity measurements as a function of pressures in the well;

wherein the program has instructions to use the vertical resistivity (Rv), the horizontal resistivity (Rh), the matrix resistivity ($R_{matrix}$), and the mud resistivity ($R_{mud}$) to estimate the cumulative fracture aperture by simultaneously solving the following two equations:

$$R_v = V_{hf} \cdot R_{mud} + (1 + V_{hf}) \cdot R_{matrix}$$

and $$1/R_h = V_{hf} \cdot 1/R_{mud} + (1 - V_{hf}) \cdot 1/R_{matrix}$$

wherein $V_{hf}$ is the cumulative fracture aperture.

8. The system of claim 7, wherein the program has instructions to use the horizontal resistivity (Rh) and the mud resistivity ($R_{mud}$) to estimate the cumulative fracture aperture using the equation:

$$1/Rh = V_{hf}/R_{mud},$$

wherein $V_{hf}$ is the cumulative fracture aperture and $V_{hf}$ is much less than 1.

9. The system of claim 7, wherein the program has instructions to use the vertical resistivity (Rv) and the matrix resistivity ($R_{matrix}$) to estimate the cumulative fracture aperture using the equation:

$$Rv = (1 - V_{hf}) \cdot R_{matrix},$$

wherein $V_{hf}$ is the cumulative fracture aperture and $V_{hf}$ is much less than 1.

10. A method comprising:

using a logging tool to measure a vertical resistivity (Rv) and a horizontal resistivity of a formation;

using the logging tool to measure at least one of a mud resistivity ($R_{mud}$) or a matrix resistivity of the formation ($R_{matrix}$);

determining a cumulative fracture aperture ($V_{hf}$) by solving each of a first expression in which Rv is expressed as a function of $R_{mud}$, $R_{matrix}$, and $V_{hf}$ and a second expression in which the reciprocal of Rh is expressed as a function of $V_{hf}$, the reciprocal of $R_{mud}$, and the reciprocal of $R_{matrix}$.

11. The method of claim 10, wherein the first expression is:

$$R_v = V_{hf} \cdot R_{mud} + (1 \cdot V_{hf}) \cdot R_{matrix}$$

and wherein the second expression is:

$$1/R_h = V_{hf} \cdot 1/R_{mud} + (1 - V_{hf}) \cdot 1/R_{matrix}.$$

12. The method of claim 11, wherein when $R_{mud} \ll R_{matrix}$, the first expression is simplified to $R_v \cong (1 - V_{hf}) \cdot R_{matrix}$, and wherein the second expression is simplified to $R_h \cong V_{hf}/R_{mud}$.

* * * * *